United States Patent [19]
Mason et al.

[11] 3,861,811
[45] Jan. 21, 1975

[54] FERRULES ON ROPE OR STRAND

[75] Inventors: Thomas Ernest Mason, Doncaster; Cyril Fox, Clayworth near Doncaster; Robert Edward Campbell, Doncaster, all of England

[73] Assignee: British Ropes Limited, Doncaster, Yorkshire, England

[22] Filed: June 20, 1972

[21] Appl. No.: 264,417

[30] Foreign Application Priority Data
June 21, 1971 Great Britain.................... 28974/71

[52] U.S. Cl.................. 403/41, 403/274, 24/115 A
[51] Int. Cl............................................... F16b 1/00
[58] Field of Search .......... 403/285, 284, 282, 274, 403/278, 288, 279, 275, 41; 174/94 R; 24/115 A, 114.5; 339/102 R, 103 R, 103 B

[56] References Cited
UNITED STATES PATENTS

| | | | |
|---|---|---|---|
| 1,001,597 | 8/1911 | Miller | 24/114.5 |
| 1,643,110 | 9/1927 | Briggs | 403/284 |
| 1,643,658 | 9/1927 | Hillix | 24/114.5 |
| 1,910,269 | 5/1933 | Sunderland | 403/284 |
| 3,036,147 | 5/1962 | Wheaton et al. | 174/90 |
| 3,098,027 | 7/1963 | Flower | 403/284 |
| 3,471,904 | 10/1969 | Aho | 403/284 |
| 3,705,445 | 12/1972 | Smollinger | 403/274 |

Primary Examiner—Andrew V. Kundrat
Attorney, Agent, or Firm—Johnson, Dienner, Emrich & Wagner

[57] ABSTRACT

A part of the rope or strand is enclosed in a tube of ductile material within a bore in a ferrule body. An annular element of plastically deformable material extends into the bore adjacent one end of the ductile tube. The body is deformed by radial compaction so that it firmly grips the annular element and the tube, which themselves engage the rope or strand securely.

7 Claims, 25 Drawing Figures

PATENTED JAN 21 1975 3,861,811

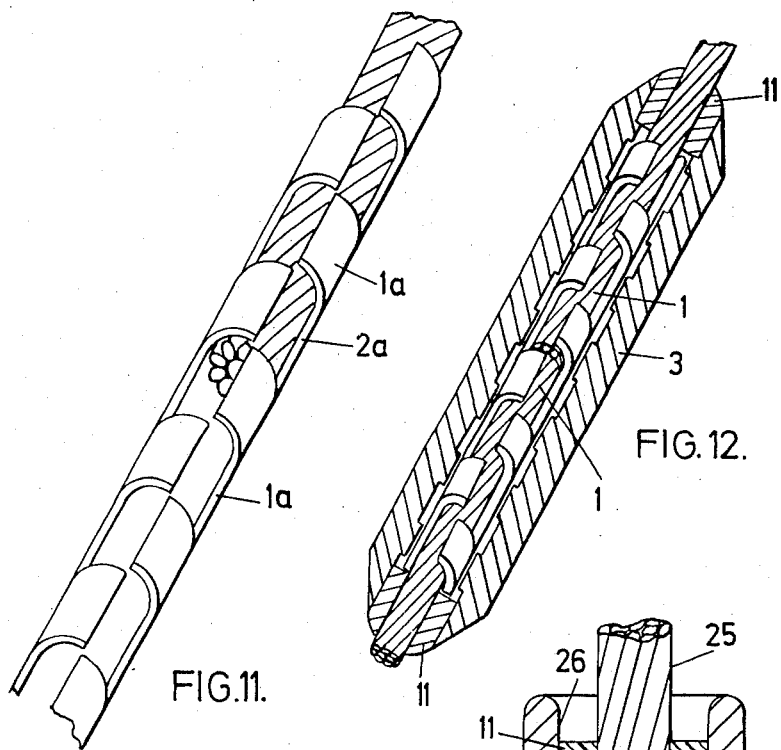
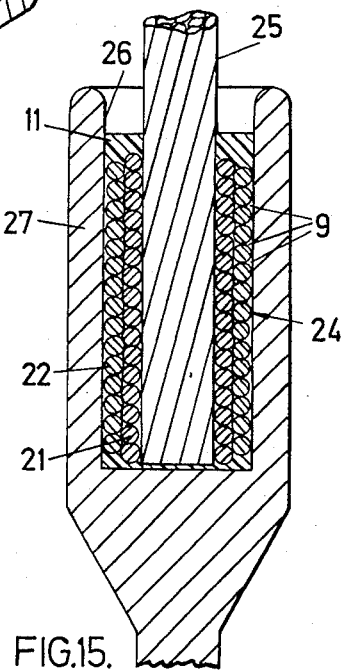
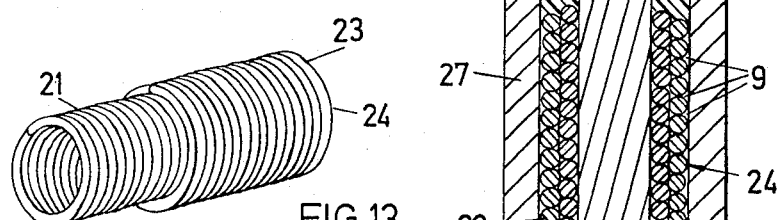
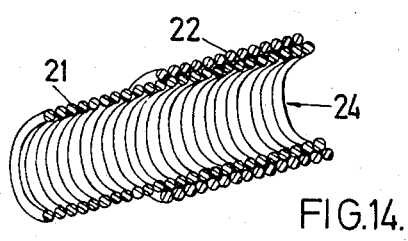
FIG. 11.  FIG. 12.  FIG. 13.  FIG. 14.  FIG. 15.

3,861,811

FERRULES ON ROPE OR STRAND

The invention relates to ferrules on wire rope and strand.

Known ferrules are more or less deficient in holding power because of inadequate frictional and mechanical engagement with the rope or strand surface. Another deficiency of known designs is their inability to resist the fatigue mechanisms encountered in rope and strand systems. They have also not been successful in providing a sufficient seal between the rope or strand and the bore of the ferrule against the ingress of corrosives. It has been proposed (U.S. Pat. No. 1,643,110) to interpose a ductile sleeve between the rope and the ferrule body.

The invention provides a ferrule on a wire rope or strand, in which a part of the rope or strand is enclosed in a substantially tubular member of ductile material within a bore in a ferrule body, and a substantially annular element of plastically deformable material extends into the bore adjacent one end of the said members, the body being of a metal which is harder than the said member, the body firmly gripping said element and said member, which itself engages the rope or strand securely.

The invention also provides a method of providing a wire rope or strand with a ferrule, comprising enclosing a part of the rope or strand in a substantially tubular member of ductile material and a substantially annular element of plastically deformable material adjacent one end of the said member, inserting the enclosed part of the rope or strand into a bore in a ferrule body, the said element being at one end of the bore, the body being of a metal which is harder than the said member, and deforming the body by radial compaction so that the body firmly grips the said element and member and deforms them to engage the rope or strand securely.

Preferably, the reaction force of the substantially tubular member against the surface of the bore of the body during deformation varies along the length of the said member, so that the deformed interface between the said member and the body is uneven. For this purpose, the internal and/or external surface of the body, and/or the external surface of the said member, may be uneven prior to compression, for instance being crenellated. The body may also be compressed at positions spaced along the length of the substantially tubular member.

The insert of deformable material, which extends into the bore adjacent one end of the substantially tubular member protects the rope or strand against fatigue and the ingress of corrosives into the bore.

The invention will be described further, by way of example only, with reference to the accompanying drawings, in which:

FIG. 11 is an isometric view of the member enclosing the end of a rope or strand;

FIG. 12 is a sectional isometric view of a connecting ferrule joining two rope or strand ends, in conjunction with the member of FIGS. 9 to 11, prior to compression;

FIG. 13 is an isometric view of a substantially tubular member comprising two helically close-coiled layers of wire, the outer layer being incomplete;

FIG. 14 is an axial section of the member of FIG. 13;

FIG. 15 is a fragmentary longitudinal section through a ferrule, including the tubular member of FIGS. 13 and 14, fitted on a rope prior to radial compression;

Figure 1:
FIG. 1 is a side elevation of a steel wire rope or strand.

The end 1 of the steel wire rope (or strand) shown in FIG. 1 is cleanly severed, preferably at right angles to its longitudinal axis, after having been served and soldered to prevent the wires from springing out of position. An annular insert 11 (described below) is threaded onto the rope, and the severed rope end 1 is inserted into a tube 2 of copper, aluminium, mild steel, or semi-rigid plastics material, having a wall thickness of about 0.01 inch (0.25 mm). The material of the tube 2 thus has a hardness less then that of the external wires of the rope. The internal bore of the tube 2 is slightly larger than the diameter of the rope, so that it is a slide fit on the rope end 1.

The enclosed rope end 1 is pushed into the cylindrical bore of a terminal ferrule body 3, until the end 1 makes contact with the blind end of the bore. The tube 2 terminates short of the open end of the bore leaving an annular space between the rope and the body 3, which receives the insert 11. The insert 11 is of plastically deformable material whose hardness is less than that of the material of the tube 2 such as an elastomer, a soft metal, or a composite material; the insert has a frustoconical head, which abuts against the end of the body 3, the head being integral with a sleeve which protudes into the bore of the body 3 and abuts the tube 2.

The shank 3 has an internal annular cavity 4 into which the material of the insert 11 flows during compression of the body 3. There may also be a similar cavity near the blind end of the bore.

The body 3 is of plain carbon steel, stainless steel, high-strength alloy steel, or nonferrous metallic material. Thus the material of the body has hardness greater than that of the material of the tube 2. The exterior of the body 3 is initially circular with regularly spaced crenellations 5 which separate ridges 7. The body 3 is either swaged or, preferably, pressed in a suitable die set, so that the initially circular ridges 7 are given a hexagonal (or other polygonal) cross-section as indicated in broken line in FIG. 3.

During the deformation of the body 3, the inner surface of the tube 2 is plastically deformed into secure engagement with the surface 6 of the rope, and partially penetrates the interstitial gaps between the wires. The uneven pressure on the exterior of the tube 2 produces an uneven interface between the body 3 and the tube 2, ensuring that the body grips the tube firmly. As explained above, the insert 11 flows into the annular cavity 4 to provide efficient retention of the insert.

Figure 3:
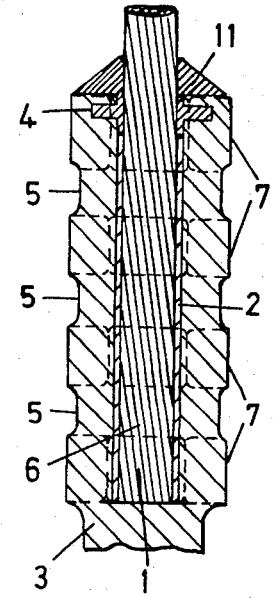
FIG. 3 is a similar view, with a superimposed ferrule body and insert, both shown in section, after compression.
Figure 4:
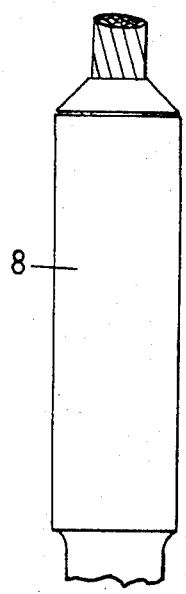
FIG. 4 is a side elevation of a cylindrical terminal ferrule on a rope or strand, prior to compression.
Figures 5, 5A:
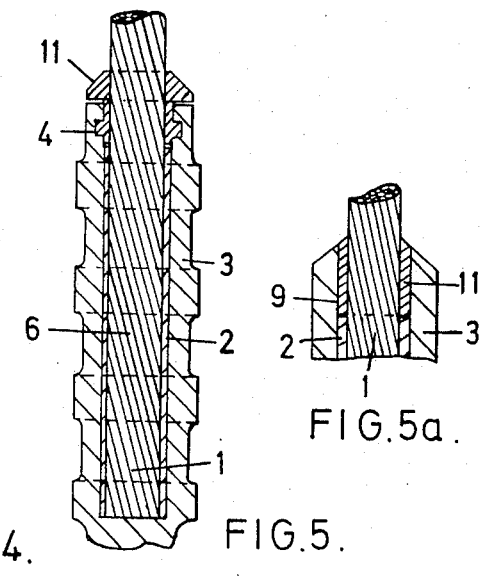
FIG. 5 is a longitudinal section through the terminal ferrule of FIG. 4 after compression.
FIG. 5a is a modified detail of FIG. 5.

FIGS. 4 and 5 show a terminal ferrule similar to that of FIG. 3, before and after compression. The ferrule body 3 initially has a smooth cylindrical exterior surface 8; this is acted upon by die sets to produce the crenellated profile shown in FIG. 5.

An alternative insert 11, which fills the annular space 9 beyond the end of the tube 2 and which finishes flush with the end of the body 3, is shown in FIG. 5a. Upon compression of the body 3 the insert is forced into firm engagement with the rope. It will be seen that the relatively soft insert 11 reduces the high fatigue stress which would otherwise occur at the abrupt end of the bore.

Figures 6, 7, 8:
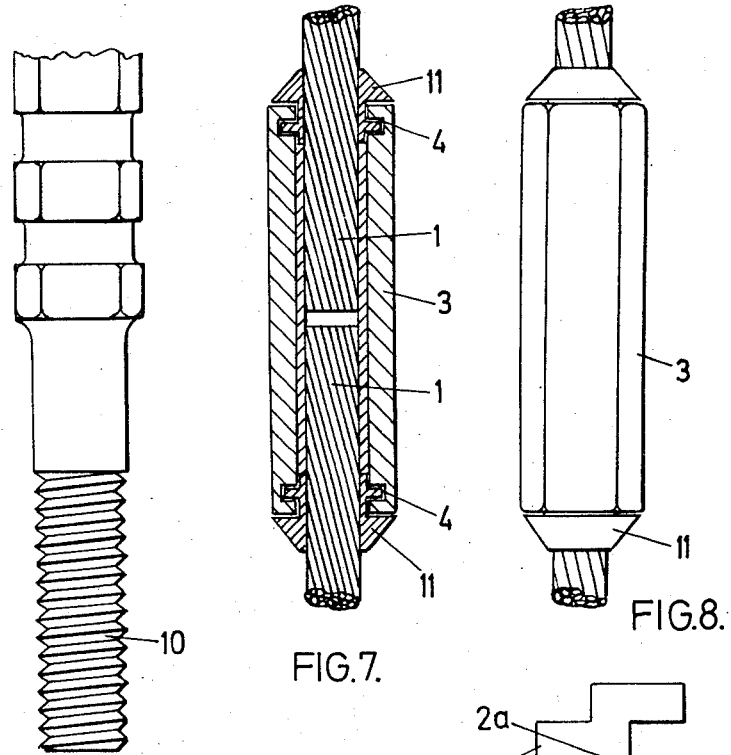
FIG. 6 is a side elevation of a terminal ferrule with an external screw-thread at its free end.
FIG. 7 is a longitudinal section through a connecting ferrule joining two ropes or strands together.
FIG. 8 is a side elevation of the connecting ferrule of FIG. 7.

In the terminal ferrule shown in FIG. 6, which could be of the type shown in FIG. 3, the free end is provided with an external screwthread 10, to accept an anchorage or other fitting.

Figure 2:
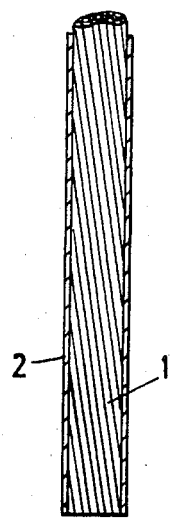
FIG. 2 is a similar view, the end of the rope or strand being surrounded by a tube of ductile material shown in section.

FIGS. 7 and 8 show a connecting ferrule joining two rope (or strand) ends together. The arrangement is similar to that described with reference to FIGS. 1 to 3. A single tube is used and an insert 11 is provided at each end of the body 3. The shank 3 is, however, compressed to produce longitudinal flats, by swaging or pressing with suitable die sets.

Figures 9, 10:
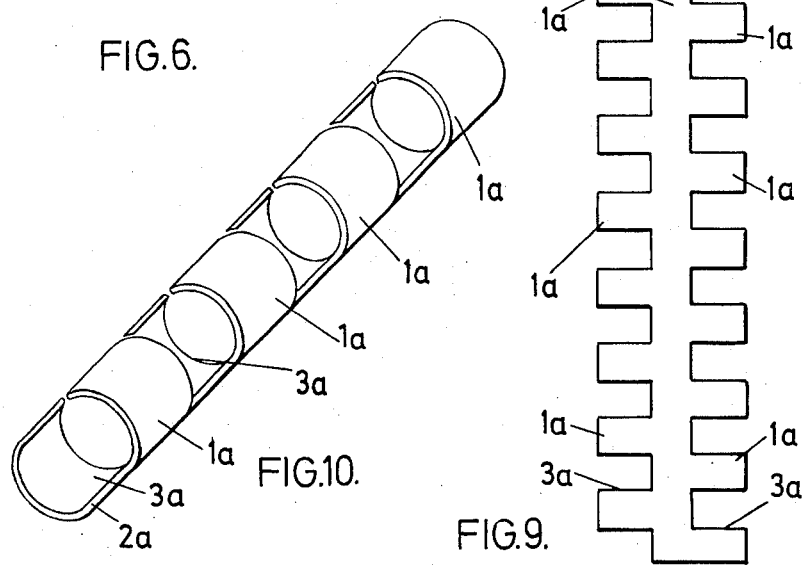
FIG. 9 is an elevation of a strip from which a substantially tubular member is to be produced.
FIG. 10 is an isometric view of this member.
Figure 16:
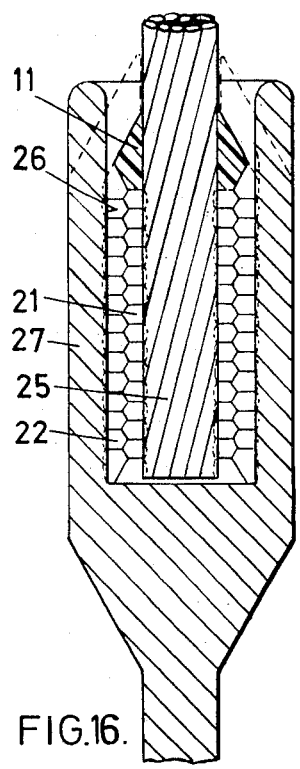
FIG. 16 is similar to FIG. 15 and shows the ferrule after compression.

An alternative form of tube is illustrated in FIGS. 9 to 12. This is a tubular member (FIG. 10) formed from a strip (FIG. 9). The strip has rectangular castellations 1a on either side of a central spine 2a. The castellations 1a on one side directly oppose the spaces 3a separating the castellations 1a on the other side. The strip is blanked out of a sheet of copper, aluminium, mild steel, or semi-rigid plastics material.

The material of the strip thus has a hardness which is less than that of the external wires of the rope and less than that of the metal of the ferrule body.

As shown in FIG. 11, the strip is crimped around the rope (or strand). The resulting tube and rope assembly is severed cleanly a short distance in from the end of the rope; thus the need to serve and solder the rope, before severing, is obviated.

Any of the ferrule bodies previously described can then be applied. FIG. 12 shows one particular form of shank 3 connecting ferrule connecting two rope ends 1. The body 3 is illustrated before compression by swaging or pressing, and it has a cylindrical outer surface tapering conically at each end. Once again an insert 11 is provided in each end of the bore. In this embodiment, however, the internal surface of the body is castellated, so that it grips the tubular member very firmly upon deformation under compression.

FIGS. 13 to 21 illustrate the use of a coiled tube. A tubular member 24 is made by initially closecoiling a layer of wire 21 on a mandrel whose diameter is slightly less than that of the rope on which the member is to be fitted; the characteristics of the wire are such that its hardness is less than that of the circumferential wires in the rope. Thus the wire can be of plain carbon or alloy steel. A second layer of wire 22 is then coiled to lie in the interstices of the first layer 21. The second layer of wire 22 is harder than the metal from which the ferrule body is made, and harder than the wire in the first layer 21.

A suitable length of the tubular member 24 is manually torsioned against the direction in which it is coiled; this momentarily increases the diameter of the internal bore, thus permitting it to be slid along the rope 25. Upon release of the torsional force the tubular member 4 contracts and firmly grips the rope 25 to act as a serving so that the end of the rope can be cleanly severed at right angles to its longitudinal axis.

The end of the rope 25 encompassed by the tubular member 24 is inserted into the bore 26 of a ferrule body 27 and radial pressure is uniformly applied to the shank to bring about plastic deformation and a reduction in diameter. In this process, the outer wires of the tubular member bed into the inner wall of the body 27; as the effects of the radial pressure are transmitted, the wires comprising the tubular member are plastically deformed until they take the form of interfitting polygons eliminating the voids, the wires of the tubular member which make contact with the rope 25 being pressed into the concavities of the rope surface.

The combined effect results in the mechanical interfitting of each interface to provide a grip which is enhanced by the fact that any force which tends to lengthen the layers of wire automatically causes them to grip even more tightly. A plastically deformable annular insert/of plastics material, to reduce fatigue and to prevent the ingress of corrosive agents from the surrounding environment, is formed around the rope adjacent the end of the tubular member 24 before compression. After compression, the extremity of the body 27 is further (broken line in FIG. 16) to retain the insert 11.

Figure 17:
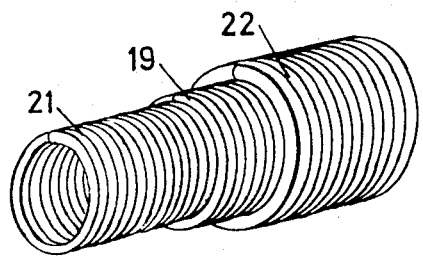
FIG. 17 is an isometric view of part of another substantially tubular member.
Figure 18:
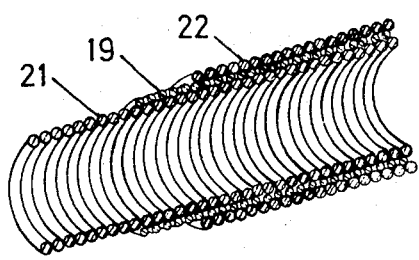
FIG. 18 is an axial section of the member of FIG. 17.
Figure 20:
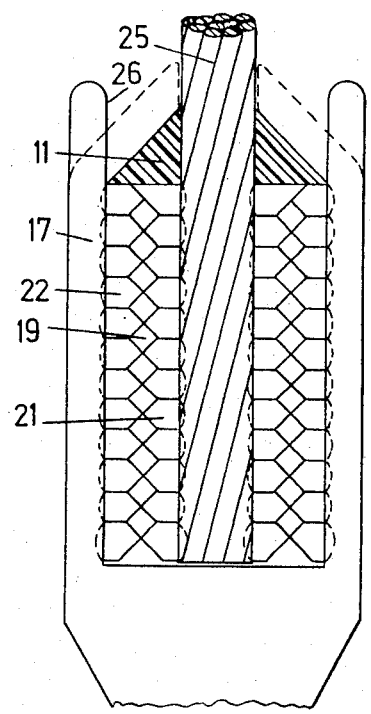
FIG. 20 is similar to FIG. 19 and shows the ferrule after compression.

In those instances where it is desirable to construct the tubular member from more than two layers of wire, FIGS. 17 and 18 illustrate an arrangement whereby, as in the previous example, the inner layer of wire 21 is close-coiled to have an internal bore slightly less than the diameter of the rope to which it is to be applied; similarly, the characteristics of the wire are such that its hardness is less than that of the circumferential wires of the rope. An intermediate layer of smaller diameter wire 19 is then close-coiled to lie in the interstices of the inner layer 21, the wire 19 having a lower hardness than the underlying layer of wire and the overlying layer of wire subsequently applied. The wire 22 of the outer layer has the same diameter as the wire 21 of the inner layer and is close-coiled to lie in the interstices of the intermediate layer of wire 19.

Figure 19:
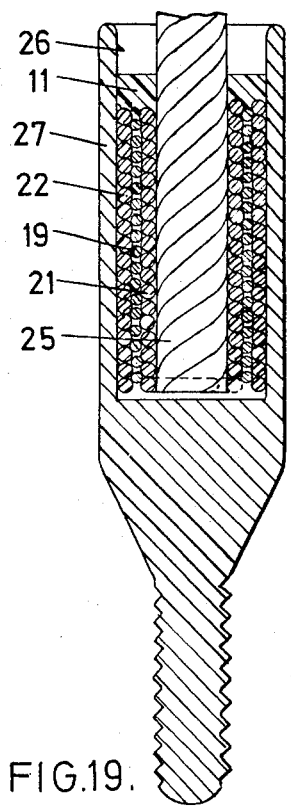
FIG. 19 is a fragmentary longitudinal section through a ferrule, including the tubular member of FIGS. 17 and 18, fitted on the rope, prior to radial compression.

The tubular member thus formed is applied to the end of the rope as already described, and the complete assembly inserted into the bore 26 of the ferrule body 27 (FIG. 19).

The application of uniform radial pressure to the circumference of the ferrule body 27 induces plastic flow and cold deformation of the tubular member so that the wires bed into the interstitial spaces in the surface of the rope and into the internal wall of the ferrule body, as indicated by the arcuate dotted lines.

The intermediate layer of wire 19 deforms to a diamond cross-section and, at points of contact with the overlying and underlying layers of wire, forms geometrically interfitting planes which provide even greater mechanical and frictional resistance to displacement when the ferrule is subjected to a tensile load of high magnitude.

A plastically deformable insert 11 of plastics material is provided, as before.

Figure 21:
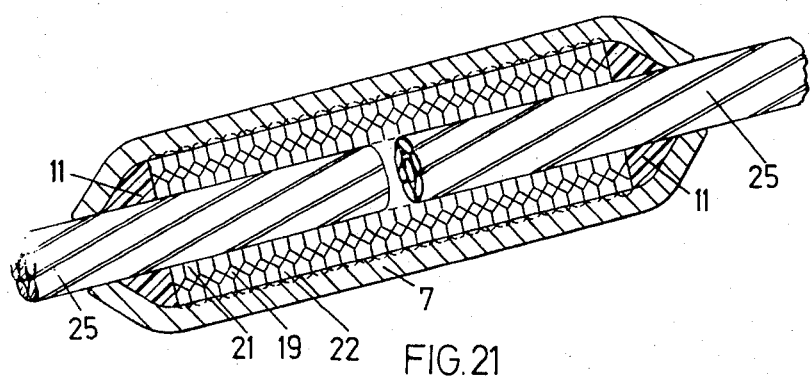
FIG. 21 is a longitudinal section of an intermediate terminal after compression.

These principles apply equally to an intermediate or connecting ferrule, shown by way of example, after compaction, in FIG. 21.

Figure 22:
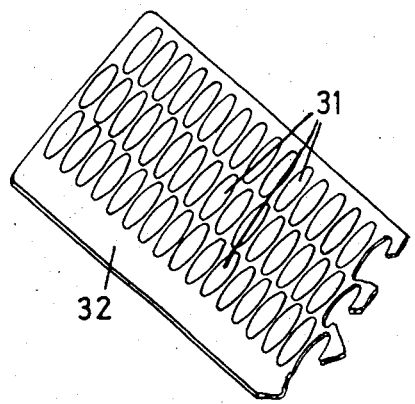
FIG. 22 is a fragmentary perspective view of a blank for forming a tube as shown in FIG. 23.
Figure 23:
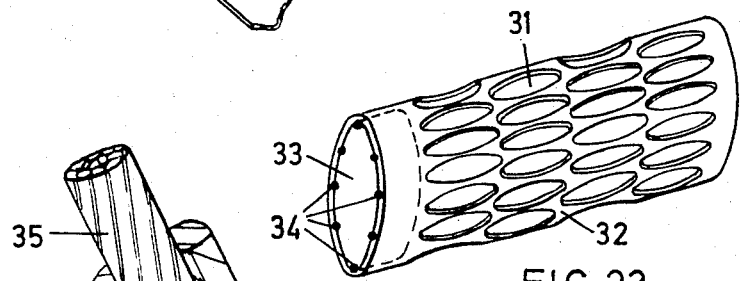
FIG. 23 is a perspective view of a tube formed from the blank of FIG. 22.

In another embodiment a thin strip of mild steel is blanked out to provide a series of staggered oval holes 31 (FIG. 22) and is formed into a tube 32 (FIG. 23) slightly larger in diameter than the rope to which it is to be applied. A mild steel plug 33 is inserted into one end of the tube 32 and is spot welded at points 34.

Figure 24:
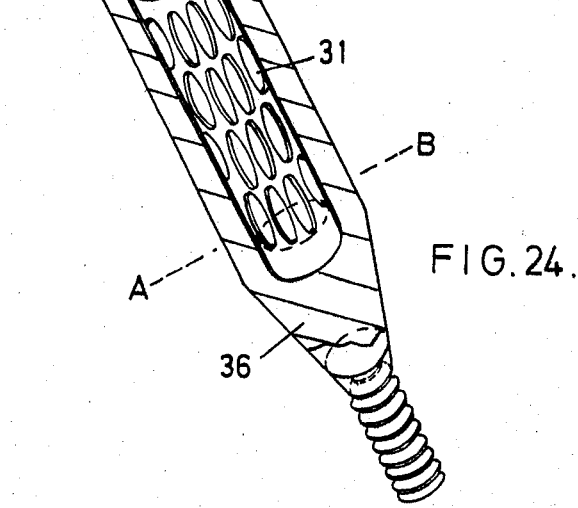
FIG. 24 is a perspective view, in longitudinal section, of part of a terminal ferrule including the tube of FIG. 23, on the end of a rope.

The liner thus formed is pushed onto the end of a rope 35 (FIG. 24) and the entire assembly is inserted as far as possible into a blind axial hole in a terminal ferrule body 36. A plastically deformable insert (not shown) is provided as before.

Sufficient external radial pressure is then applied to the ferrule body above the line A–B, by pressing or swaging, to bring all the mating surfaces into physical contact and provide permanent deformation. The holes 31 are, however, sufficiently deep to prevent the ferrule body 36 from coming into contact with the rope 35. This operation creates a constriction immediately ahead of the plug 33 thereby anchoring the tube 32 within the ferrule 36.

In service, the application of linear tension to the live end of the rope will result in the holes 31 in the tube 32 undergoing further elongation, increasing its grip on the rope as it tries to diminish in diameter. The same will also happen to the ferrule body.

Various modifications may be made within the scope of the invention. For instance, the tube could be formed by one or more layers of woven wire.

We claim:

1. A ferrule on a wire rope or strand, in which a part of the rope or strand is enclosed by a tubular member within a bore in a ferrule body and by an annular element adjacent the end of the tubular member in at least one open end of the bore, the ferrule body being radially compressed so as to radially deform the tubular member and the annular element into gripping engagement with the rope or strand, at least the radially inner part of the tubular member being of a ductile material which before compaction has a hardness less than that of the external wires of the rope or strand, the ferrule body being of metal which before compaction has a hardness greater than that of the ductile material of the radially inner part of the tubular member, the annular element being of a plastically deformable material which before and after compaction has a hardness which is less than that of the ductile material of the radially inner part of the tubular member, the annular element serving as a seal between the rope or strand and the ferrule body.

2. A ferrule as claimed in claim 1, wherein the bore has a peripheral cavity which receives part of the annular element.

3. A ferrule as claimed in claim 1, wherein the interface between the tubular member and the ferrule is uneven.

4. A ferrule as claimed in claim 1, wherein the tubular member is of sheet metal.

5. A ferrule as claimed in claim 1, wherein the tubular member is perforated.

6. A ferrule as claimed in claim 1, wherein the tubular member comprises coiled wire.

7. A ferrule as claimed in claim 6, in which the tubular member comprises an inner layer of coiled wire whose hardness before compaction is less than that of the external wires of the rope or strand, and an outer layer of coiled wire whose hardness before compaction is greater than that of the metal of the ferrule body.

* * * * *